(12) United States Patent
Pickren

(10) Patent No.: US 12,079,344 B2
(45) Date of Patent: Sep. 3, 2024

(54) CYBERSECURITY VULNERABILITY REPORTING AND RETESTING PLATFORM

(71) Applicant: BugPoC, LLC, Clearwater, FL (US)

(72) Inventor: Ryan Pickren, Oldsmar, FL (US)

(73) Assignee: BucPoc, LC, Oldsmar, FL (US)

( * ) Notice: Subject to any disclaimer, the term of this patent is extended or adjusted under 35 U.S.C. 154(b) by 1037 days.

(21) Appl. No.: 16/892,634

(22) Filed: Jun. 4, 2020

(65) Prior Publication Data

US 2021/0141906 A1 May 13, 2021

Related U.S. Application Data

(60) Provisional application No. 62/933,615, filed on Nov. 11, 2019.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 2006/0277539 A1* | 12/2006 | Amarasinghe | G06F 21/54 717/168 |
| 2019/0198128 A1* | 6/2019 | Fan | G11C 11/4085 |
| 2021/0082309 A1* | 3/2021 | Rosenberg | G09B 5/02 |

\* cited by examiner

*Primary Examiner* — Fatoumata Traore
(74) *Attorney, Agent, or Firm* — GrayRobinson, P.A.

(57) ABSTRACT

A platform creating a third-party secure testing region for security experts to build and test proof-of-concepts thereby allowing the security expert or security team to report and retest the cybersecurity vulnerability and relay said vulnerability to the product team who can remediate the problem. The platform of the present invention also allows for automatic retesting of the vulnerability as soon as remediation is finished. Further, the present invention may optionally include an automatic proof-of-concept generator or automatic threat detector.

10 Claims, 3 Drawing Sheets

CYBERSECURITY VULNERABILITY REPORTING AND RETESTING PLATFORM

CROSS-REFERENCE TO RELATED INVENTIONS

This application claims the benefit of earlier-filed provisional application No. 62/933,615, titled "Cybersecurity Vulnerability Reporting and Retesting Platform," filed Nov. 11, 2019, the disclosure of which is hereby incorporated by reference herein.

TECHNICAL FIELD

This disclosure relates to a platform for the reporting and retesting of cybersecurity vulnerabilities. Specifically, this disclosure relates to a software as a service platform to aid in the building, sharing, and retesting of working demonstrations of computer code to illustrate cybersecurity vulnerabilities in software.

BACKGROUND OF THE INVENTION

The software vulnerability identification, tracking, and remediation lifecycle at most technology companies falls into one of two models. In the first model, vulnerabilities are identified by security experts, reported to a security team, relayed to a product team via a centralized issue tracking system, then remediated by the product team. Optionally, retesting may occur by the security team. This model is frequently used by larger companies with a dedicated security team.

In another model, vulnerabilities are identified by security experts, reported directly to product teams, tracked by a centralized issue tracking system, then remediated by the product team. Optionally, retesting may occur by the security experts. As the term is used herein, "security experts" refers to, but is not limited to, penetration testers, red-teamers, bug bounty hunters, security engineers, & academics This model is frequently used by smaller companies, who may not have a dedicated security team.

Neither of these models contain a well-defined mechanism of storing and maintaining the artifacts generated by the security experts. More particularly, vulnerability identification oftentimes involves creating a Proof-of-Concept ("PoC") to act as a working demo to illustrate the issue. This PoC may consist of front-end code, back-end code, network traffic, and/or peripheral environmental setup. These artifacts tend to be lost or degraded during the current vulnerability tracking lifecycles. These PoCs are either turned into vague human-readable descriptions (commonly seen in penetration test deliverables), reverse engineered and rebuilt by internal security teams, or disregarded entirely.

As the term is used herein, "front-end code" refers to, but is not limited to, code run by user-agents in the context of the browser such as HTML, CSS, or JavaScript. Second, the term "back-end code" refers to, but is not limited to, code run by servers such as Python, Java, or C++, "network traffic" refers to any internet traffic generated by clients to be sent to servers such as raw UDP/TCP packets, HTTP(s) requests, or Web Socket bytestreams. Finally, the term "peripheral environmental setup" refers to, but is not limited to, any configuration, outside of the code itself, required to ensure the code is executed in the correct context. For example, some front-end code may only be executable if the web origin matches a certain pattern or some Python code may only be runnable if the underline operating system contains certain precompiled binaries.

Therefore, it is an object of this invention to provide an improvement which overcomes the aforementioned inadequacies of the prior art and provides an improvement which is a significant contribution to the advancement of the cybersecurity vulnerability reporting and retesting art.

A further object of the present invention is to build, preserve, and publish PoCs without needing to initialize or maintain surrounding environments.

A further object of the present invention is to allow PoCs to be consumed by a vendor of the vulnerability software for retesting and remediation purposes or by other security experts for academic purposes.

A further object of the present invention is to allow product teams to be able to understand or reproduce specific issues concerning cybersecurity.

A further object of the present invention is to create a platform that is quick and not tedious.

A further object of the present invention is to allow for a safe platform for a security team to test the potential vulnerability.

A further object of the present invention is to create a platform that does not require continuous maintenance by a security team.

A further object of the present invention is to allow for reproducibility of testing.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a new model to share and test PoCs without any environmental overhead or operational costs through the use of a separate, encrypted platform to reduce the likelihood of cybersecurity issues on the native server.

Embodiments of the present invention are herein described by way of example and are directed to a platform for sharing and testing PoCs. The aforementioned state of the art of cybersecurity vulnerability reporting and retesting shows the need for improvements, specifically in the ability of the reporting and retesting method to be secure on the client-side. The platform creates a third-party area for security experts to build and test PoCs thereby allowing the security expert or security team to report and retest the cybersecurity vulnerability and relay said vulnerability to the product team who can remediate the problem. The platform of the present invention also allows for automatic retesting of the vulnerability as soon as remediation is finished.

Other embodiments of the present invention may use iterations of a PoC as the PoC is developed by the user, along with any derivative data, PoC metadata, PoC responses, or other related information, to train an automatic PoC generator (the "APG"). The present invention may also use iterations of a PoC as it is developed by the user, along with any derivative data, PoC metadata, PoC responses, or other related information, to train an automatic threat detector (the "ATD") which could detect when a bug is being developed and/or exploited in a production and/or live environment through learned patterns found within any derivative data, PoC metadata, PoC responses, or other related information.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

DETAILED DESCRIPTION OF THE DRAWINGS

The present invention relates to a platform to build and share cybersecurity proof-of-concepts (PoCs). The various components of the present invention, and the manner in which they interrelate, are described in greater detail hereinafter.

Figure 1:
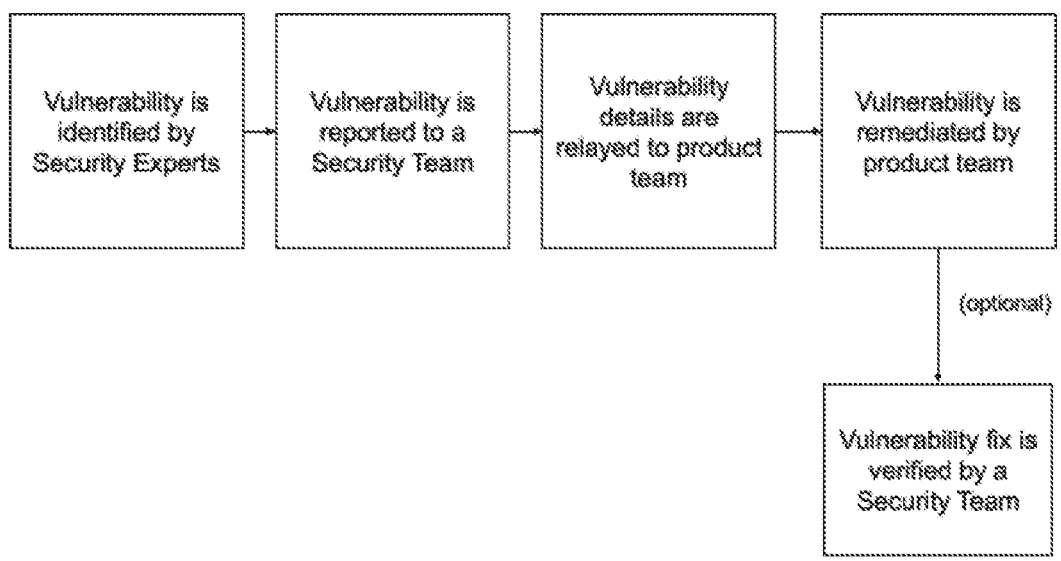
FIG. 1 is a flowchart depicting a method of vulnerability reporting and retesting present in the prior art.
Figure 2:
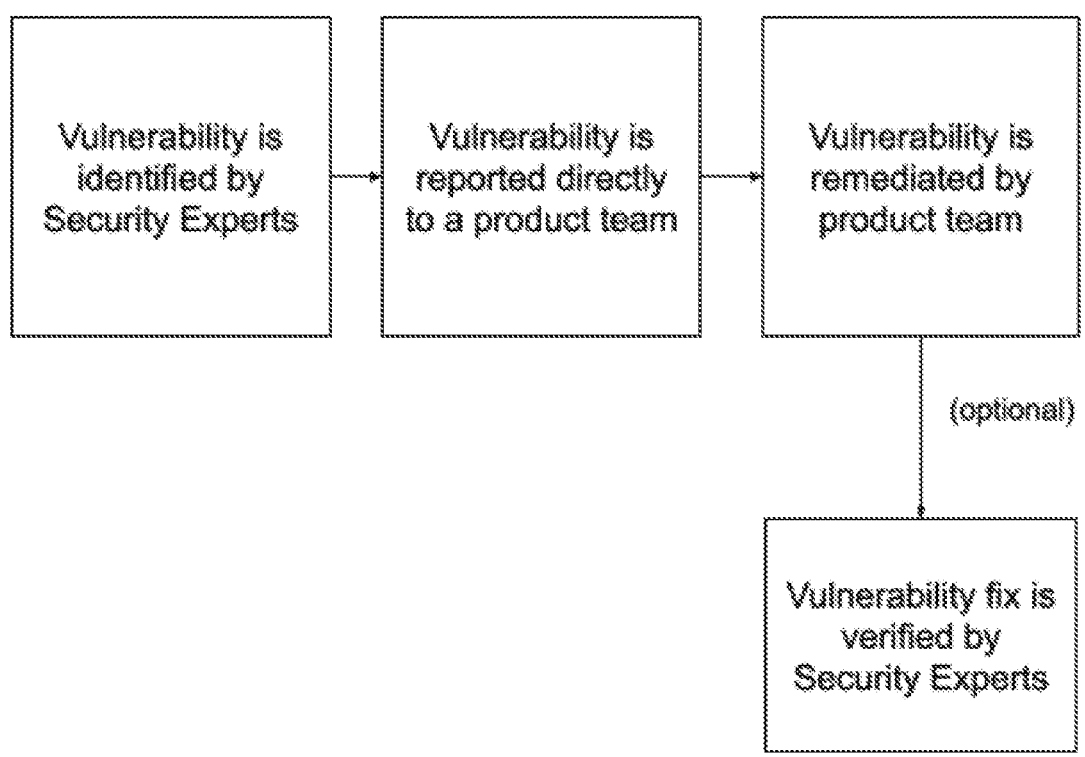
FIG. 2 is a flowchart depicting a method of vulnerability reporting and retesting present in the prior art.

As can be seen in FIGS. 1 and 2, prior art platforms worked in one of two ways. In the first model, as shown in FIG. 1, vulnerabilities are identified by security experts, reported to a security team, relayed to a product team via a centralized issue tracking system, then remediated by the product team. Optionally, retesting may occur by the security team. This model is frequently used by larger companies with a dedicated security team.

In the second model, as shown in FIG. 2, vulnerabilities are identified by security experts, reported directly to product teams, tracked by a centralized issue tracking system, then remediated by the product team. Optionally, retesting may occur by the security experts. This model is frequently used by smaller companies, who may not have a dedicated security team.

The issue with both of these models is that neither contain a well-defined mechanism of storing and maintaining the artifacts generated by the security experts. More particularly, vulnerability identification oftentimes involves creating a Proof-of-Concept (PoC) to act as a working demo to illustrate the issue.

Figure 3:
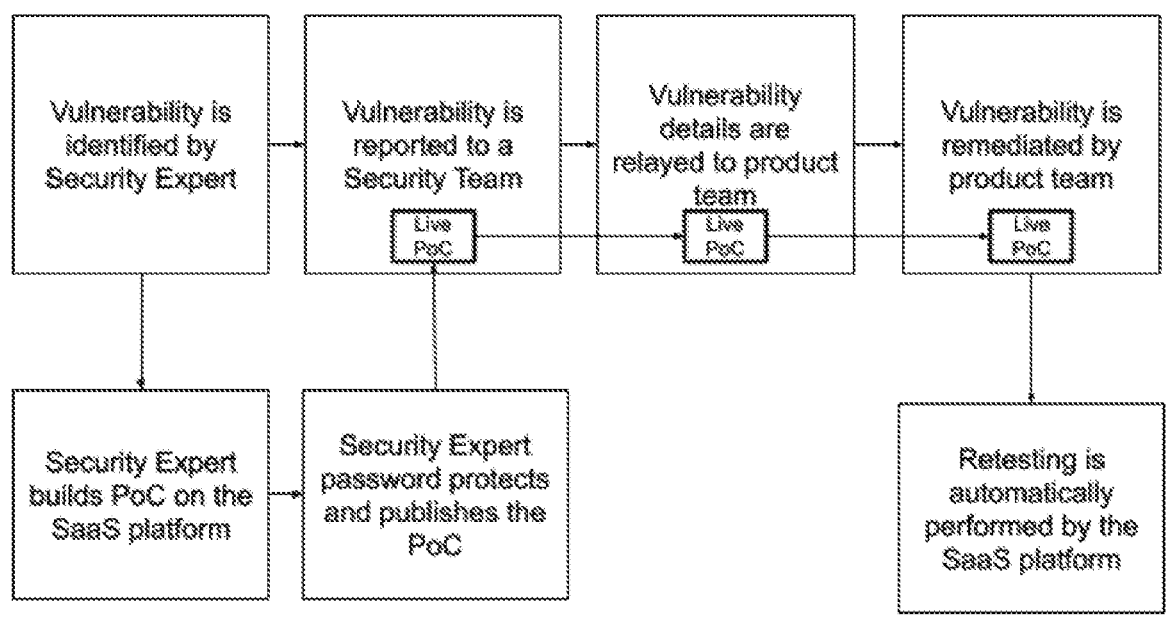
FIG. 3 is a flow depicting the method of vulnerability reporting and retesting of the present invention.

The present invention, as shown in FIG. 3, comprises a new model to build and share PoCs without any environmental overhead or operational costs. This platform allows security experts to natively build PoCs on a third-party server or second data region using advanced templates and simple configuration files. These templates will automatically write much of the exploit code required to have a working demo to illustrate specific issues, thus saving the security expert time. The third-party server/second data region will also be responsible for preserving the environment required for the code to be successfully executed (including, but not limited to, customizable subdomains for front-end code origin and pre-packaged back-end code dependencies). This setup will allow the vendor security team to instantly reproduce the issue without any overhead or debugging. Furthermore, the platform will be able to seamlessly replay network traffic without any additional tools or security scanners, thus allowing the vendor product team to reproduce the issue without purchasing or installing advanced network software.

As seen in FIG. 3, once a vulnerability is found in the live data environment, a security evaluator or automatic proof-of-concept generator can develop a PoC in a second data region, preferably a second server. The PoC can then be migrated back into the live data environment wherein the security evaluator can review the PoC and details relating to the vulnerability and then remediate the issue. Thereafter, the system will then automatically retest the PoC to ensure that the vulnerability does not reoccur.

These PoCs will also be encrypted and password protected, thus insuring all vulnerability details are secured. The back-end code will also be executed remotely, on servers owned and operated by the platform, which ensures that the vendor teams won't inadvertently run malicious code if the security expert goes rogue and attempts to infiltrate the vendor using a Trojan PoC.

Because these PoCs are stored, indexed, and executed on third party servers owned by the platform, vendor security and product teams can simply include links to them when tracking and reporting internally using existing issue tracking systems. These PoCs can be used to immediately reproduce issues and verify fixes. Lastly, certain categories of vulnerabilities can be automatically validated using the PoC, which allows the platform to perform automated retesting and fix verification.

Alternative embodiments may use iterations of a PoC as it is developed by the user, along with any derivative data, PoC metadata, PoC responses, or other related information in order to train an Automatic PoC Generator ("APG"). The APG is capable of suggesting modifications to the PoC, which may or may not be in development, to make the PoC successfully exploit a bug or multiple bugs. Multiple APGs may be implemented to reach this functionality as well. An APG may also suggest additions or modifications to PoCs that causes their exploit to be replicated on other portions of a customer's web application that may or may not be of a similar type. The APG may also suggest additions or modifications to PoCs that causes their exploit to be replicated on other web applications that may or may not belong to different customers. The APG may also use machine learning to suggest novel PoCs based on patterns that it has learned from working PoCs.

Further, the present invention may implement an automatic threat detector ("ATD") through the use of iterations of a PoC as it is developed by the user, along with any derivative data, PoC metadata, PoC responses, or other related information in order to potentially detect when a bug is being developed and/or exploited in a production and/or live environment through learned patters found within any of the used data. The embodiment of the present invention incorporating an ATD may include an ATD that can be managed by a customer or an outside third party or that can be packaged using packaging software systems including, but not limited to, dockerizing. If the ATD is housed on a customer's system, the ATD can alert the customer to a potentially bad actor and allows the customer to act on the response of that alert. Alert messages can be sent to whichever party is responsible for responding and can also be automatically forwarded to law enforcement agencies. If a bad actor is detected, the ATD can limit or restrict access to the customer's system as well as reduce the availability of the system as a whole. This reduction in availability reduces the availability of the system so that further exploitation or research into an exploitation can be hampered or prevented. This reduction in availability may also be modified so that it can either affect all users of the system or specified bad-actor users through the use of methods such as IP filtering, device filtering, or other known means. The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method of cybersecurity vulnerability reporting and retesting comprising:
   identifying a security vulnerability in a first data region;
   creating a second data region on a third-party server, the second data region further comprising executable back-end code;
   creating of at least one proof-of-concept;
   encrypting the proof-of-concept; reporting the security vulnerability to a security team for evaluation and remediation;
   automatically performing retesting to ensure the security vulnerability does not reoccur;
   optionally using iterations of the proof-of-concept to train an automatic proof-of-concept generator that automatically suggests modifications to the proof-of-concept and which can suggest new proof-of-concepts based on patterns from an in-use proof-of-concept; and
   optionally using an automatic threat detector developed using iterations of the proof-of-concept to detect when a security vulnerability is being exploited.

2. The method of cybersecurity vulnerability reporting and retesting of claim 1 wherein the proof-of-concept is stored, indexed, and executed on the third-party server.

3. The method of cybersecurity vulnerability reporting and retesting of claim 1 wherein the back-end code can be executed remotely.

4. The method of cybersecurity vulnerability reporting and retesting of claim 1 wherein the automatic threat detector is managed by a third party.

5. The method of cybersecurity vulnerability reporting and retesting of claim 1 wherein the automatic threat detector is packaged.

6. The method of cybersecurity vulnerability reporting and retesting of claim 1 wherein the automatic threat detector sends an alert a customer in response to a potential bad actor thereby allowing for the customer to respond to the alert.

7. The method of cybersecurity vulnerability reporting and retesting of claim 6 wherein the automatic threat detector further limits access to a customer's system and reduces system availability in response to the alert.

8. A system for cybersecurity vulnerability reporting and retesting comprising:
   a security evaluator;
   a first server hosting user data in a first data region;
   an encrypted second server wherein, after a security vulnerability is identified, the security vulnerability is relayed to the second server by the security evaluator;
   at least one encrypted proof-of-concept created on the second server which is migrated back to the first server wherein the security vulnerability can be remediated using the proof-of-concept in the first data region by the security evaluator;
   automatically performing retesting to ensure the security vulnerability does not reoccur;
   optionally using iterations of the proof-of-concept to train an automatic proof-of-concept generator that automatically suggests modifications to the proof-of-concept and which can suggest new proof-of-concepts based on patterns from an in-use proof-of-concept; and
   optionally using an automatic threat detector developed using iterations of the proof-of-concept to detect when a security vulnerability is being exploited.

9. The system of cybersecurity vulnerability reporting and retesting of claim 8 wherein the second server is hosted by a third-party.

10. The system of cybersecurity vulnerability reporting and retesting of claim 8 wherein the first server is hosted by a customer who is not the security evaluator.

* * * * *